US008286234B2

(12) United States Patent
Kano

(10) Patent No.: US 8,286,234 B2
(45) Date of Patent: Oct. 9, 2012

(54) IMAGE PROCESSING APPARATUS, SCREEN SELECTION METHOD, AND SCREEN SELECTION PROGRAM EMBODIED ON COMPUTER READABLE MEDIUM

(75) Inventor: Takahiro Kano, Toyonaka (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 254 days.

(21) Appl. No.: 12/557,142

(22) Filed: Sep. 10, 2009

(65) Prior Publication Data
US 2010/0064363 A1    Mar. 11, 2010

(30) Foreign Application Priority Data
Sep. 10, 2008  (JP) ................. 2008-232568

(51) Int. Cl.
*G06F 21/00* (2006.01)
(52) U.S. Cl. ....................................................... 726/19
(58) Field of Classification Search .................. None
See application file for complete search history.

(56) References Cited

U.S. PATENT DOCUMENTS

| | | | | |
|---|---|---|---|---|
| 5,907,410 | A * | 5/1999 | Ohtake | 358/468 |
| 6,307,640 | B1 * | 10/2001 | Motegi | 358/1.14 |
| 6,453,127 | B2 * | 9/2002 | Wood et al. | 399/8 |
| 6,944,412 | B2 * | 9/2005 | Mishima et al. | 399/81 |
| 7,433,067 | B2 * | 10/2008 | Nonoyama et al. | 358/1.15 |
| 7,538,902 | B2 * | 5/2009 | Kurotsu et al. | 358/1.16 |
| 7,633,637 | B2 * | 12/2009 | Fujimoto | 358/1.14 |
| 7,634,801 | B2 * | 12/2009 | Kizawa | 726/4 |
| RE41,875 | E * | 10/2010 | Motegi | 358/1.14 |
| 2001/0019953 | A1 * | 9/2001 | Furukawa et al. | 455/420 |
| 2002/0145748 | A1 * | 10/2002 | Nonoyama et al. | 358/1.14 |
| 2003/0011813 | A1 * | 1/2003 | Peter et al. | 358/1.15 |
| 2003/0219272 | A1 * | 11/2003 | Mishima et al. | 399/81 |
| 2004/0156069 | A1 * | 8/2004 | Kurotsu et al. | 358/1.13 |
| 2005/0094195 | A1 * | 5/2005 | Sakamoto et al. | 358/1.15 |
| 2005/0141020 | A1 * | 6/2005 | Harano | 358/1.15 |

(Continued)

FOREIGN PATENT DOCUMENTS

JP          10-079819          3/1998

(Continued)

OTHER PUBLICATIONS

Japanese Notice of Allowance mailed Nov. 30, 2010, directed to Japanese Patent Application No. 232568/2008; 6 pages.

(Continued)

*Primary Examiner* — Oscar Louie
(74) *Attorney, Agent, or Firm* — Morrison & Foerster LLP

(57) ABSTRACT

In order to improve operability by decreasing the number of times of switching between screens, an MFP includes an authentication portion which authenticates a user using authentication information input into one of first to third user I/Fs, a process executing portion which executes processes according to settings input, a first association data storing portion which stores first association data associating input data with the authenticated user, a second association data storing portion which stores second association data associating processes executed for the input data with the respective user I/Fs, and a determining portion which determines, in response to authentication by the authentication portion, a screen for the process associated by the second association data with one of the first to third user I/Fs that accepted the authentication information used for the authentication, if data associated with the authenticated user by the first association data is stored.

6 Claims, 10 Drawing Sheets

U.S. PATENT DOCUMENTS

| | | | |
|---|---|---|---|
| 2005/0152544 A1* | 7/2005 | Kizawa | 380/55 |
| 2005/0254086 A1* | 11/2005 | Shouno | 358/1.15 |
| 2006/0017951 A1* | 1/2006 | Tanaka | 358/1.13 |
| 2006/0203283 A1* | 9/2006 | Fujimoto | 358/1.15 |
| 2007/0101415 A1* | 5/2007 | Masui | 726/5 |
| 2007/0180253 A1* | 8/2007 | Hamaguchi | 713/176 |
| 2008/0174803 A1* | 7/2008 | Matsuba | 358/1.13 |
| 2008/0189775 A1* | 8/2008 | Fujita | 726/7 |
| 2008/0244712 A1* | 10/2008 | Kitada et al. | 726/5 |
| 2008/0250494 A1* | 10/2008 | Nagata | 726/19 |
| 2009/0064320 A1* | 3/2009 | Okamoto et al. | 726/19 |
| 2009/0103124 A1 | 4/2009 | Kimura et al. | |
| 2009/0276846 A1 | 11/2009 | Kotaka | |

FOREIGN PATENT DOCUMENTS

| | | |
|---|---|---|
| JP | 2001-217948 | 8/2001 |
| JP | 2003-132029 | 5/2003 |
| JP | 3478188 | 10/2003 |
| JP | 2004-227136 | 8/2004 |
| JP | 2004-348267 | 12/2004 |
| JP | 2007-79639 | 3/2007 |
| JP | 2007-148924 | 6/2007 |
| JP | 2007-174215 | 7/2007 |
| JP | 2007-208823 | 8/2007 |
| JP | 2007-318519 | 12/2007 |
| JP | 2009-253405 | 10/2009 |
| JP | 2009-272770 | 11/2009 |

OTHER PUBLICATIONS

Japanese Office Action issued Sep. 14, 2010, directed to counterpart Japanese Application No. 2008-232568; 10 pages.

* cited by examiner

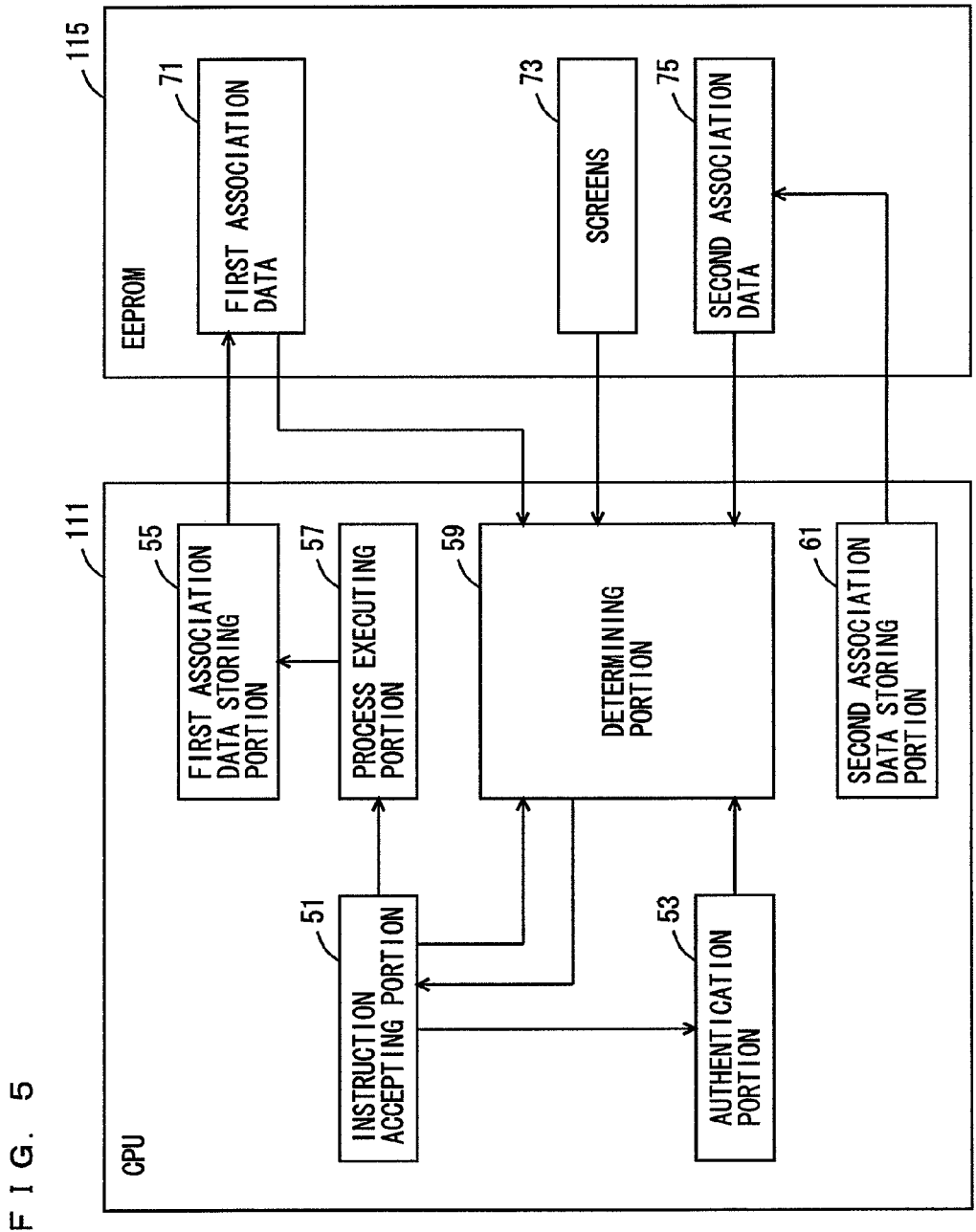

FIG. 6

| USER IDENTIFICATION INFORMATION | DATA IDENTIFICATION INFORMATION |
|---|---|

FIG. 7

| USER I/F  /  DATA INPUT PROCESS | OPERATION PANEL | PC BROWSER | MOBILE COMMUNICATION TERMINAL BROWSER |
|---|---|---|---|
| AUTHENTICATION PRINT | JOB EXECUTION (PRINT SCREEN) | JOB ACQUISITION (JOB MANAGEMENT SCREEN) | JOB DELETION (DELETE SCREEN) |
| FACSIMILE RECEPTION | JOB EXECUTION (PRINT SCREEN) | JOB ACQUISITION (CONFIDENTIAL BOX SCREEN) | JOB DELETION (DELETE SCREEN) |
| BOX STORAGE | JOB EXECUTION (PRINT SCREEN) | JOB ACQUISITION (DOCUMENT DOWNLOAD SCREEN) | JOB DELETION (DELETE SCREEN) |

F I G. 1 2
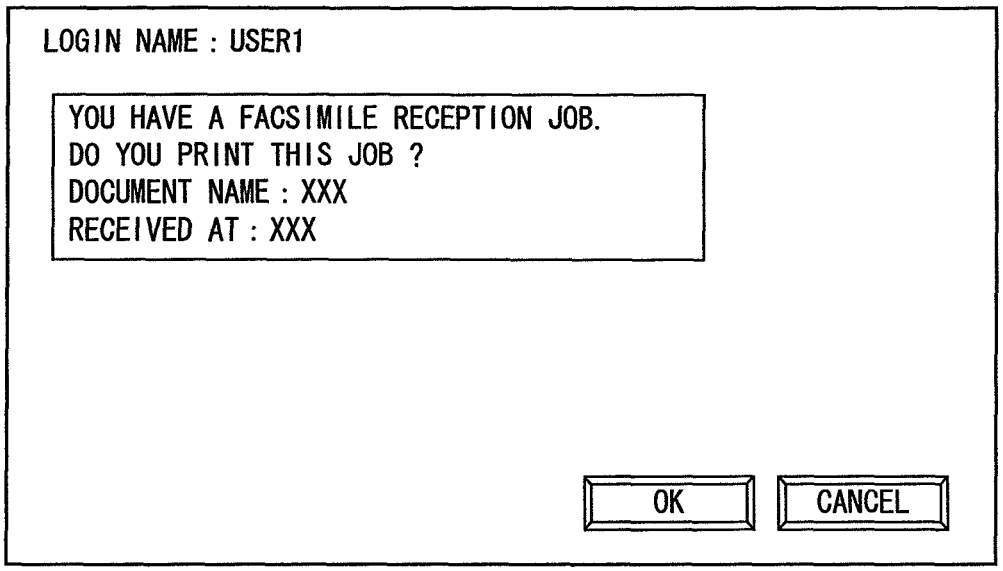
F I G. 1 3
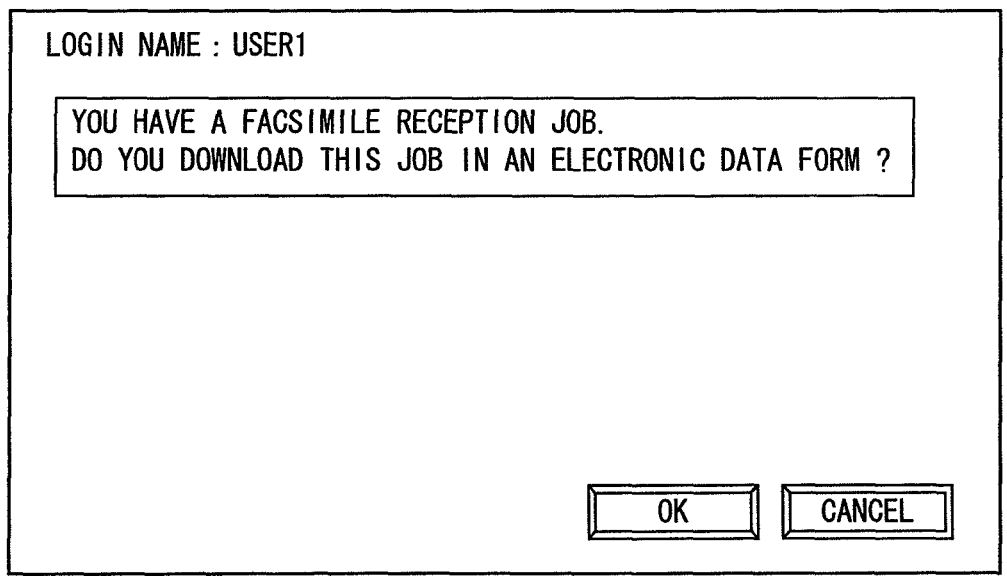
F I G. 1 4

IMAGE PROCESSING APPARATUS, SCREEN SELECTION METHOD, AND SCREEN SELECTION PROGRAM EMBODIED ON COMPUTER READABLE MEDIUM

This application is based on Japanese Patent Application No. 2008-232568 filed with Japan Patent Office on Sep. 10, 2008, the entire content of which is hereby incorporated by reference.

BACKGROUND OF THE INVENTION

1. Field of the Invention

The present invention relates to an image processing apparatus, a screen selection method, and a screen selection program embodied on a computer readable medium. More particularly, the present invention relates to an image processing apparatus having a plurality of user interfaces, and a screen selection method and a screen selection program embodied on a computer readable medium which are executed in the image processing apparatus.

2. Description of the Related Art

Recently, composite machines provided with printing, copying, and facsimile transmitting/receiving functions have increased in the variety of their functions and, hence, increased in complexity of their operations. Therefore, Japanese Patent Application Laid-Open No. 10-079819 discloses a composite machine wherein an input/output user interface screen corresponding to the category of frequently used jobs is displayed as an initial screen at login.

A composite machine can be remotely operated, and has a plurality of types of user interfaces. A user uses such various types of user interfaces according to the user's intended uses to determine the process to be executed by the composite machine. With the composite machine disclosed in Japanese Patent Application Laid-Open No. 10-079819, however, only one initial screen is displayed even when a plurality of types of user interfaces is used. This means that the screen displayed may not be the one desired by the user.

SUMMARY OF THE INVENTION

The present invention has been accomplished in view of the foregoing problem, and an object of the present invention is to provide an image processing apparatus, a screen selection method, and a screen selection program embodied on a computer readable medium which have improved operability with a decreased number of times of switching between screens.

In order to achieve the above-described objects, according to an aspect of the present invention, an image processing apparatus includes: a plurality of types of user interfaces for accepting an instruction from a user; an authentication portion to accept authentication information input into one of the plurality of types of user interfaces and authenticate a user based on the authentication information; a process executing portion to execute at least one of a plurality of types of processes according to settings input into the one of the plurality of types of user interfaces; a first association data storing portion, in the case where the process executed by the process executing portion is a data input process in which data is input from the outside, to store first association data which associates the input data with user identification information of the authenticated user; a second association data storing portion to store second association data which associates a process to be executed for the input data with a respective one of the plurality of types of user interfaces; and a determining portion, in response to the authentication by the authentication portion, to determine a screen for accepting settings for causing the process executing portion to execute the process associated by the second association data with the one of the plurality of types of user interfaces through which the authentication information used for the authentication by the authentication portion has been accepted, in the case where data associated by the first association data with the user identification information of the authenticated user is stored.

According to another aspect of the present invention, a screen selection method is executed by an image processing apparatus which includes a plurality of types of user interfaces for accepting an instruction from a user, wherein the screen selection method includes the steps of: accepting authentication information input into one of the plurality of types of user interfaces and authenticating a user based on the authentication information; executing at least one of a plurality of types of processes according to settings input into the one of the plurality of types of user interfaces; in the case where the executed process is a data input process in which data is input from the outside, storing first association data which associates data identification information for identifying the input data with user identification information of the authenticated user; storing second association data which associates a process to be executed for the input data with a respective one of the plurality of types of user interfaces; and in response to the authentication in the authenticating step, in the case where data associated by the first association data with the user identification information of the authenticated user is stored, determining a screen for accepting settings for execution of the process associated by the second association data with the one of the plurality of types of user interfaces through which the authentication information has been accepted.

According to a further aspect of the present invention, a screen selection program embodied on a computer readable medium is executed by a computer controlling an image processing apparatus, the image processing apparatus including a plurality of types of user interfaces for accepting an instruction from a user, wherein the screen selection program causes the computer to execute the steps of: accepting authentication information input into one of the plurality of types of user interfaces and authenticating a user based on the authentication information; executing at least one of a plurality of types of processes according to settings input into the one of the plurality of types of user interfaces; in the case where the executed process is a data input process in which data is input from the outside, storing first association data which associates data identification information for identifying the input data with user identification information of the authenticated user; storing second association data which associates a process to be executed for the input data with a respective one of the plurality of types of user interfaces; and in response to the authentication in the authenticating step, in the case where data associated by the first association data with the user identification information of the authenticated user is stored, determining a screen for accepting settings for execution of the process associated by the second association data with the one of the plurality of types of user interfaces through which the authentication information has been accepted.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 5 is a functional block diagram schematically showing the functions of a CPU included in the MFP according to the embodiment of the present invention.

FIG. 6 shows an example of the format of a first association record.

FIG. 7 shows an example of workflow definition information.

FIGS. 9 to 17 show setting screens by way of example.

DESCRIPTION OF THE PREFERRED EMBODIMENTS

Figure 1:
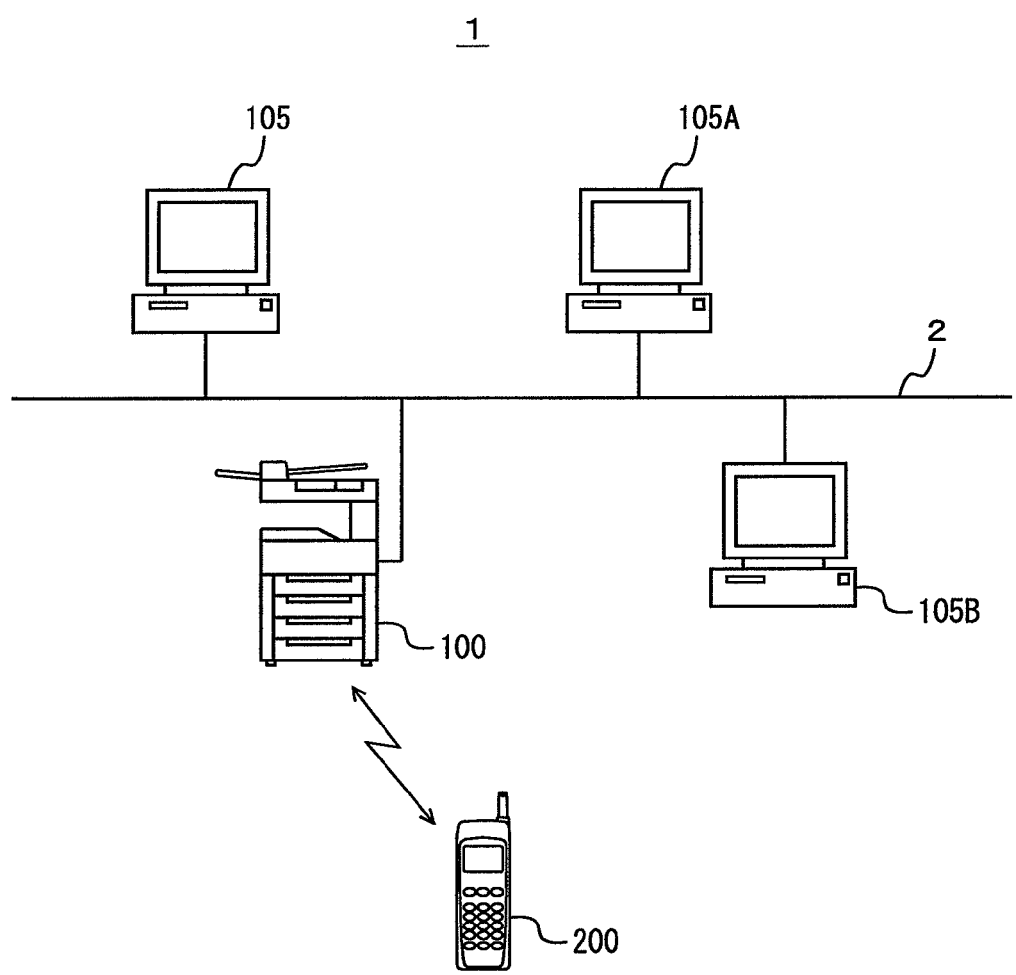
FIG. 1 schematically shows an image processing system according to an embodiment of the present invention.

Embodiments of the present invention will now be described with reference to the drawings. In the following description, like reference characters denote like parts, which have like names and functions, and therefore, detailed description thereof will not be repeated.

FIG. 1 schematically shows an image processing system according to an embodiment of the present invention. Referring to FIG. 1, an image processing system 1 includes a multi function peripheral (MFP) 100, personal computers (hereinafter, referred to as "PCs") 105, 105A, and 105B, and a mobile communication terminal 200, which are each connected to a network 2.

Network 2 is a local area network (LAN), which may be connected in a wired or wireless manner. Network 2 is not necessarily the LAN; it may be a network using public switched telephone networks (PSTN), and the like. Furthermore, network 2 is connected to the Internet or a wide area network (WAN).

MFP 100 includes a scanner device for reading an original, and an image forming device and a facsimile device for forming an image on a recording medium such as a sheet of paper based on image data, and has the image reading function, copying function, and facsimile transmitting/receiving function. MFP 100, which functions as a Web server, can be remotely operated. Specifically, MFP 100 stores a Web page described in a markup language such as hypertext markup language (HTML) or extensible markup language (XML), and transmits the Web page in response to a request from any of PCs 105, 105A, and 105B, or mobile communication terminal 200 as a client. The Web page stored in MFP 100 is an operation screen for operating MFP 100. MFP 100 accepts a remote operation by receiving settings or commands which are input into the operation screen by a user.

PCs 105, 105A, and 105B are typical computers. Their hardware configurations and functions are well known, and thus, description thereof will not be provided here. Each of PCs 105, 105A, and 105B has installed therein a browsing program which downloads and displays a Web page stored in a Web server.

Mobile communication terminal 200, which is a typical cellular phone, can connect to a telephone network to make a call by communicating with a base station in a wireless manner. Furthermore, mobile communication terminal 200 can communicate with MFP 100 in a wireless manner. The wireless communication may be a communication using infrared rays or electromagnetic waves. Therefore, mobile communication terminal 200 can communicate with MFP 100 directly or via the telephone network. Furthermore, mobile communication terminal 200 has installed therein a browsing program which downloads and displays a Web page stored in a Web server.

A user of PC 105, 105A, or 105B, or mobile communication terminal 200 can peruse an operation screen received from MFP 100 by executing the browsing program in PC 105, 105A, or 105B, or mobile communication terminal 200, and inputting into the browsing program a URL address which is pre-assigned to MFP 100 functioning as the Web server. As the user inputs the settings or commands according to the operation screen, PC 105, 105A, or 105B, or mobile communication terminal 200 in which the browsing program is executed transmits the settings or commands to MFP 100, so that MFP 100 can be operated remotely. Therefore, MFP 100 includes a first user interface (hereinafter, referred to as a "first user I/F") for a user to operate MFP 100 directly, a second user interface (hereinafter, referred to as a "second user I/F") for a user to use PC 105, 105A, or 105B to operate MFP 100 remotely, and a third user interface (hereinafter, referred to as a "third user I/F") for a user to use mobile communication terminal 200 to operate MFP 100 remotely.

While MFP 100 is described as an example of the image processing apparatus in the present embodiment, the image processing apparatus is not limited to MFP 100, and may be, e.g., a printer, facsimile machine, computer, or other device having a plurality of user interfaces.

Figure 2:
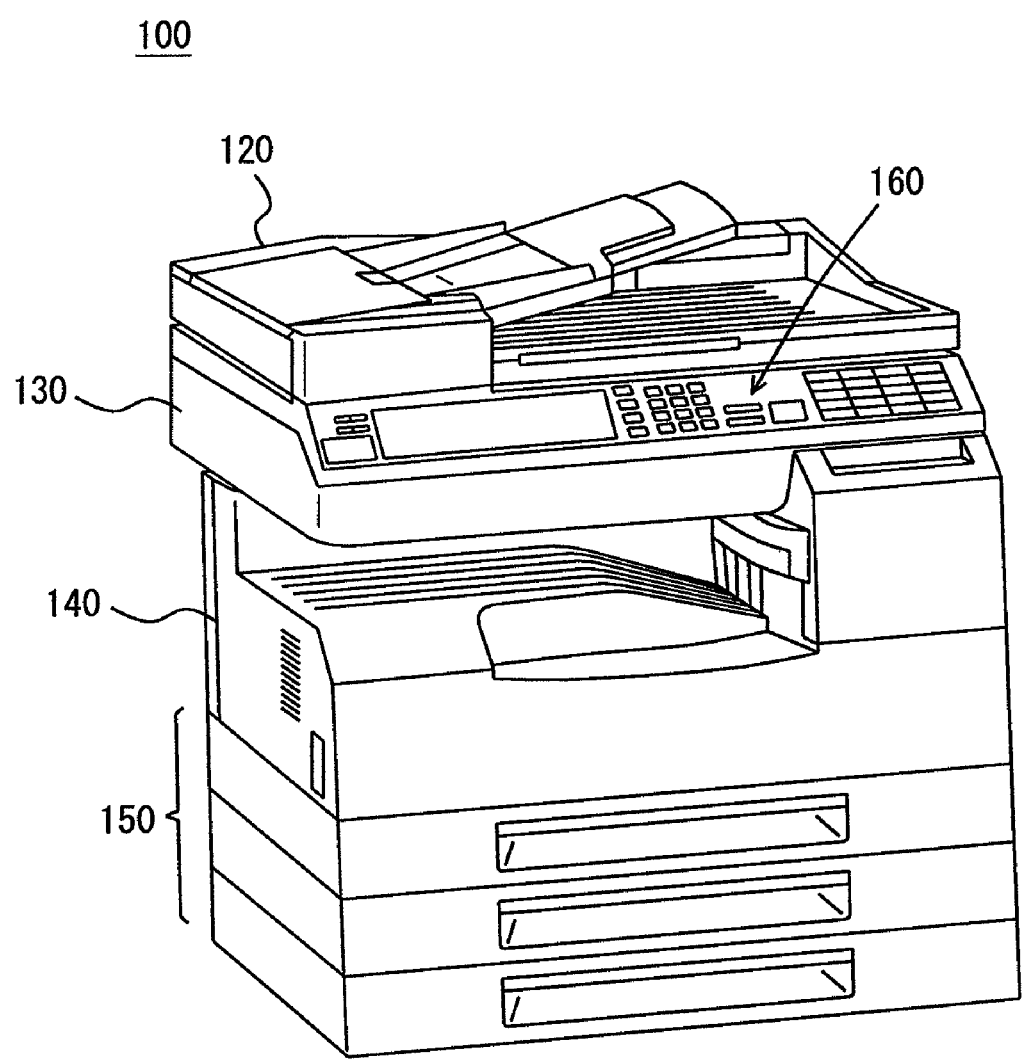
FIG. 2 is a perspective view of an MFP.
Figure 3:
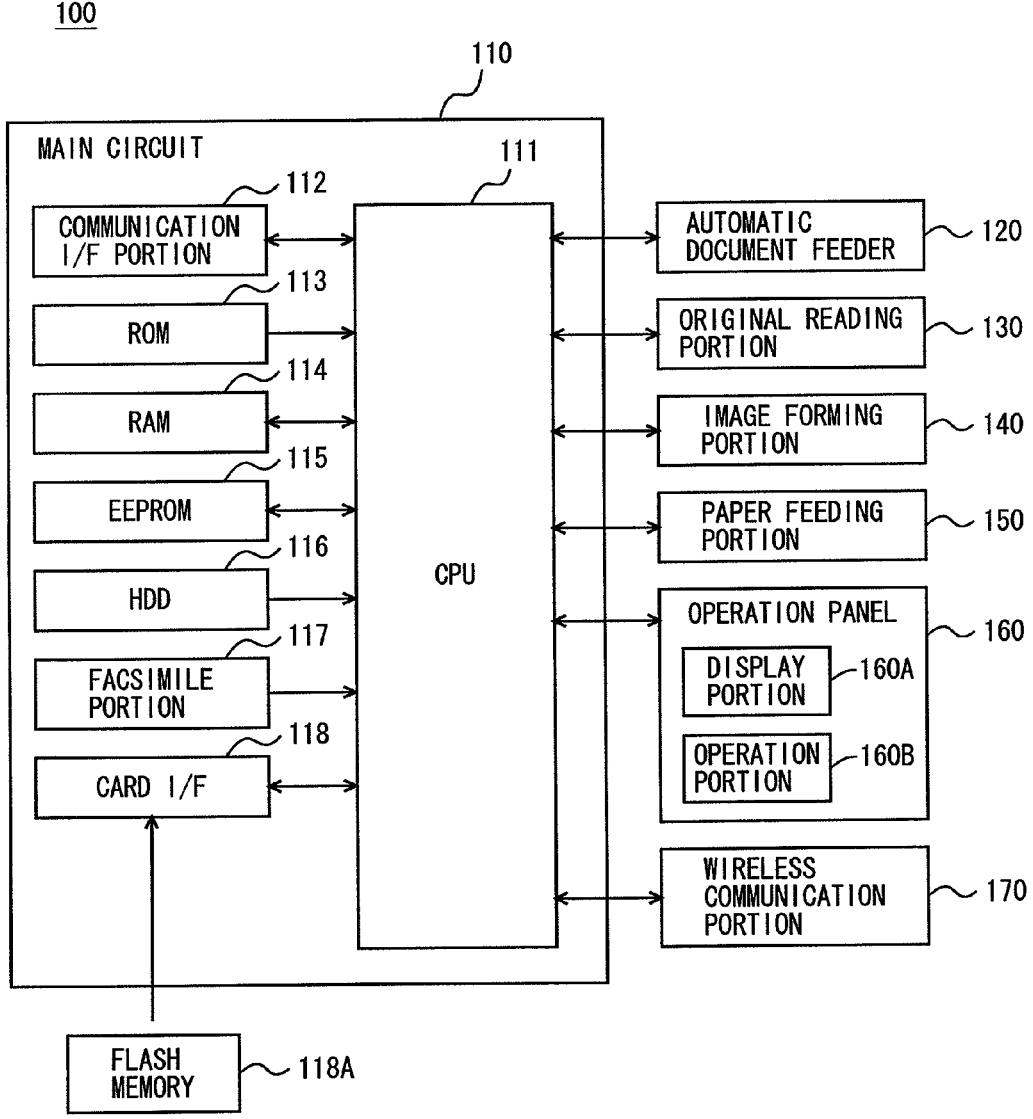
FIG. 3 is a functional block diagram schematically showing the functions of the MFP.

FIG. 2 is a perspective view of the MFP, and FIG. 3 is a functional block diagram schematically showing the functions of the MFP. Referring to FIGS. 2 and 3, MFP 100 includes: a main circuit 110; an original reading portion 130 which reads an original; an automatic document feeder 120 which carries an original into original reading portion 130; an image forming portion 140 which forms an image on a sheet of paper or the like based on image data which is output from original reading portion 130 after being read from an original by original reading portion 130; a paper feeding portion 150 which supplies sheets of paper to image forming portion 140; an operation panel 160 serving as a user interface; and a wireless communication portion 170.

Main circuit 110 includes a central processing unit (CPU) 111, a communication interface (I/F) portion 112, a read only memory (ROM) 113, a random access memory (RAM) 114, an electrically erasable and programmable ROM (EEPROM) 115, a hard disk drive (HDD) 116 as a mass storage, a facsimile portion 117, and a card interface (I/F) 118 mounted with a flash memory 118A. CPU 111 is connected with automatic document feeder 120, original reading portion 130, image forming portion 140, paper feeding portion 150, operation panel 160, and wireless communication portion 170, and is responsible for overall control of MFP 100.

ROM 113 stores a program executed by CPU 111 or data necessary for execution of the program. RAM 114 is used as a work area when CPU 111 executes a program. Further, RAM 114 temporarily stores read data (image data) continuously transmitted from original reading portion 130.

Operation panel 160, which is provided on an upper surface of MFP 100, includes a display portion 160A and an operation portion 160B. Operation panel 160 is the first user I/F for a user to directly input operations into MFP 100. Display portion 160A is a display such as a liquid crystal display (LCD) or an organic electro-luminescence display (organic ELD), and displays an instruction menu for the user, information about acquired image data, and others. Operation portion 160B, which is provided with a plurality of keys, accepts input data such as instructions, characters, and numerical characters, according to the key operations by the user. Operation portion 160B further includes a touch panel provided on display portion 160A.

Communication I/F portion 112 is an interface for connecting MFP 100 to network 2. CPU 111 communicates with PCs 105, 105A, and 105B via communication I/F portion 112, for transmission/reception of data. Further, communication I/F portion 112 is capable of communicating with a computer connected to the Internet via network 2. This allows data to be transmitted to and received from mobile communication terminal 200 via communication I/F portion 112. When communication I/F portion 112 communicates with PC 105, 105A, or 105B, communication I/F portion 112 constitutes part of the second user I/F as MFP 100 is operated remotely from PC 105, 105A, or 105B. When communication I/F portion 112 communicates with mobile communication terminal 200, communication I/F portion 112 constitutes part of the third user I/F as MFP 100 is operated remotely from mobile communication terminal 200.

Wireless communication portion 170 communicates with mobile communication terminal 200 in a wireless manner using infrared rays as a communication medium. While the wireless communication using infrared rays as the communication medium is described by way of example, the communication medium is not limited to infrared rays, and, for example, may be electromagnetic waves. Wireless communication portion 170 is part of the third user I/F used in the case where MFP 100 is operated remotely from mobile communication terminal 200.

Facsimile portion 117 is connected to public switched telephone networks (PSTN), and transmits facsimile data to or receives facsimile data from the PSTN. Facsimile portion 117 stores the received facsimile data in HDD 116, or outputs it to image forming portion 140. Image forming portion 140 prints the facsimile data received from facsimile portion 117 on a sheet of paper. Further, facsimile portion 117 converts the data stored in HDD 116 to facsimile data, and transmits it to a facsimile machine connected to the PSTN.

Card I/F 118 is mounted with flash memory 118A. CPU 111 is capable of accessing flash memory 118A via card I/F 118. CPU 111 loads a screen selection program, which is recorded on flash memory 118A mounted to card I/F 118, into RAM 114 for execution. It is noted that the program executed by CPU 111 is not restricted to the screen selection program recorded on flash memory 118A. CPU 111 may load the screen selection program stored in HDD 116 into RAM 114 for execution. In this case, another computer connected to network 2 may rewrite the screen selection program stored in HDD 116 of MFP 100, or may additionally write a new screen selection program therein. Further, MFP 100 may download a screen selection program from another computer connected to network 2, and store the program in HDD 116. As used herein, the "program" includes, not only the program which CPU 111 can execute directly, but also a source program, a compressed program, an encrypted program, and others.

Figure 4:
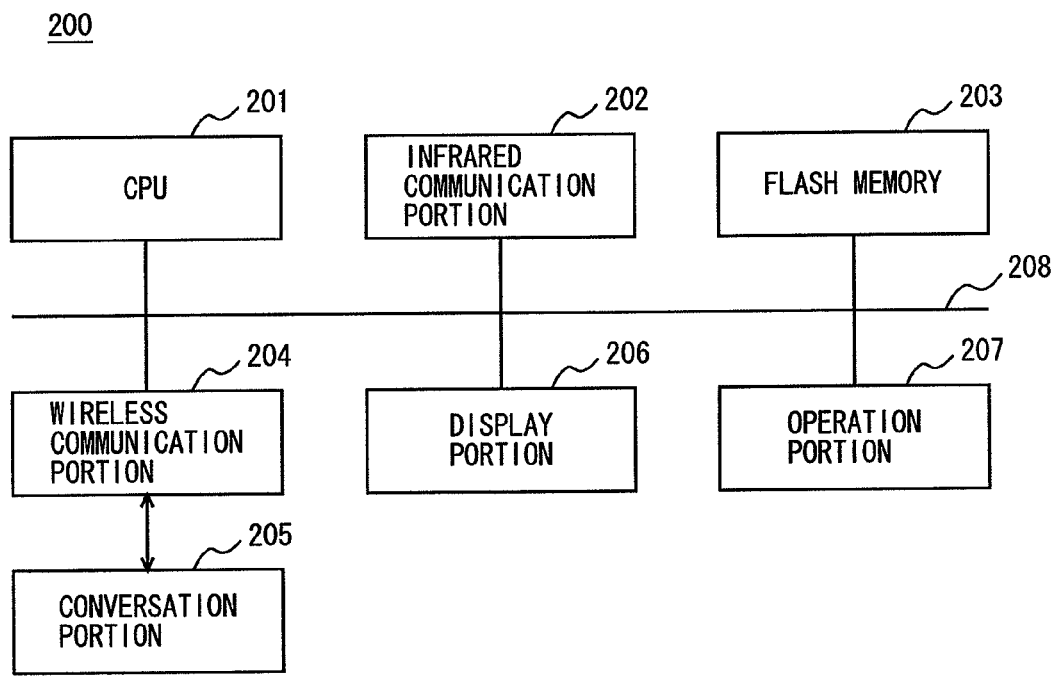
FIG. 4 is a functional block diagram schematically showing the functions of a mobile communication terminal.

FIG. 4 is a functional block diagram schematically showing the functions of a mobile communication terminal. Referring to FIG. 4, mobile communication terminal 200 includes: a CPU 201 which is responsible for overall control of mobile communication terminal 200; an infrared communication portion 202; a flash memory 203 which stores data in a nonvolatile manner; a conversation portion 205; a wireless communication portion 204 connected to conversation portion 205; a display portion 206 displaying information; and an operation portion 207 which accepts inputs by a user.

Wireless communication portion 204 communicates with a base-station device connected to a telephone communication network in a wireless manner. The wireless communication includes sound communication in which sound is transmitted and received, and data communication in which data is transmitted and received. For sound communication, wireless communication portion 204 connects mobile communication terminal 200 to the telephone communication network to allow a conversation using conversation portion 205. Wireless communication portion 204 decodes sound signals generated by demodulating wireless signals which are received from the base-station device, for output to conversation portion 205. Wireless communication portion 204 codes sound input from conversation portion 205, and transmits it to the base-station device. Conversation portion 205 has a microphone and a speaker, and outputs from the speaker the sound which is input from wireless communication portion 204, and outputs to wireless communication portion 204 the sound which is input from a microphone. Furthermore, wireless communication portion 204 is controlled by CPU 201. For data communication, wireless communication portion 204 connects mobile communication terminal 200 to MFP 100 via the Internet, to transmit data to and receive data from MFP 100.

Infrared communication portion 202 communicates with MFP 100 in a wireless manner using infrared rays as a communication medium. While the wireless communication using infrared rays as the communication medium is described as an example, the communication medium is not limited to infrared rays, and may be, e.g., electromagnetic waves or other medium which enables wireless communication with MFP 100. Infrared communication portion 202 is controlled by CPU 201. Infrared communication portion 202 connects mobile communication terminal 200 to MFP 100 to transmit data to and receive data from MFP 100. While there are two types of methods with which mobile communication terminal 200 can communicate with MFP 100, CPU 201 communicates with MFP 100 via infrared communication portion 202 or wireless communication portion 204, whichever is specified by a user.

Display portion 206 is a display such as a liquid crystal display (LCD) or an organic electro-luminescence display (organic ELD), and displays an instruction menu for the user, information about acquired image data, and others. Operation portion 207, which is provided with a plurality of keys, accepts input data such as instructions, characters, and numerical characters, according to the key operations by the user.

FIG. 5 is a functional block diagram schematically showing the functions of a CPU included in the MFP according to the embodiment of the present invention. Referring to FIG. 5, CPU 111 included in MFP 100 includes: an instruction accepting portion 51 which accepts an instruction; an authentication portion 53 which authenticates a user who inputs an instruction; a process executing portion 57 which executes a process according to the instruction accepted; a first association data storing portion 55; a second association data storing portion 61; and a determining portion 59 which determines a screen to be output.

Instruction accepting portion 51 accepts an instruction through one of the first, second, and third user I/Fs. When a user inputs an instruction into operation portion 160B which constitutes the first user I/F, the instruction is accepted from operation portion 160B. In this case, instruction accepting portion 51 outputs to process executing portion 57 the instruction accepted through the first user I/F, and furthermore, instruction accepting portion 51 outputs to determining portion 59 I/F identification information for identifying the first user I/F, in order to show that the instruction has been input through the first user I/F.

When a user remotely operates MFP 100 using PC 105, 105A, or 105B, instruction accepting portion 51 accepts an instruction from communication I/F portion 112. Communication I/F portion 112 receives device identification information for identifying the device from which the instruction has been transmitted, and correspondingly, instruction accepting portion 51 determines, based on the device identification information, that it has accepted the instruction through the second user I/F. Instruction accepting portion 51 outputs to process executing portion 57 the instruction accepted through the second I/F, and furthermore, instruction accepting portion 51 outputs to determining portion 59 I/F identification information for identifying the second user I/F, in order to show that the instruction has been input through the second user I/F.

When a user remotely operates MFP 100 using mobile communication terminal 200, instruction accepting portion 51 accepts an instruction from wireless communication portion 170 or communication I/F portion 112. When instruction accepting portion 51 accepts the instruction from wireless communication portion 170, it determines that it has accepted the instruction through the third user I/F. When instruction accepting portion 51 accepts the instruction from communication I/F portion 112, communication I/F portion 112 receives device identification information for identifying the device from which the instruction has been transmitted, and therefore, instruction accepting portion 51 determines, based on the device identification information, that it has accepted the instruction through the third user I/F. Instruction accepting portion 51 outputs to process executing portion 57 the instruction accepted through the third user I/F, and furthermore, instruction accepting portion 51 outputs to determining portion 59 I/F identification information for identifying the third user I/F, in order to show that the instruction has been input through the third user I/F.

When instruction accepting portion 51 accepts an authentication instruction as the instruction, instruction accepting portion 51 outputs authentication information included in the authentication instruction to authentication portion 53. The authentication information includes user identification information for identifying a user, and a password. While the user identification information and the password are used here as the authentication information, biological information such as a fingerprint, an iris pattern, a voice print, or a vein pattern may also be used as the authentication information, instead of the password.

Authentication portion 53 authenticates the user who inputs the instruction, or the user who is operating MFP 100 directly or remotely, based on the authentication information input from instruction accepting portion 51. Specifically, with the authentication information of the users who are authorized to use MFP 100 being stored in EEPROM 115 in advance, authentication portion 53 determines whether the authentication information matching the authentication information input from instruction accepting portion 51 is stored in EEPROM 115 in advance. If the same authentication information as that input from instruction accepting portion 51 is stored in EEPROM 115 in advance, authentication portion 53 authenticates the user. If not, it does not authenticate the user. When authentication portion 53 authenticates the user, it outputs the user identification information for the authenticated user to determining portion 59.

When authentication portion 53 authenticates the user, it permits a login for the user authenticated, and assumes any instructions accepted in instruction accepting portion 51 as the instructions input by the authenticated user until a logout instruction is accepted subsequently. It is noted that authentication portion 53 assumes that the user has logged out when instruction accepting portion 51 accepts no instruction for predetermined duration.

Process executing portion 57 executes processes according to the instructions input from instruction accepting portion 51. The instructions from instruction accepting portion 51 include parameters, setting instructions which designate the settings, and command instructions including commands designating execution of the processes. The processes executed by process executing portion 57 include a data input process in which externally input data is stored in HDD 116, a data conversion process in which image processing, format conversion, and the like are performed on data stored in HDD 116, and a data output process in which data stored in HDD 116 is output to the outside. When process executing portion 57 executes the data input process, it outputs data identification information for identifying the data which has been stored in HDD 116 to first association data storing portion 55.

When first association data storing portion 55 receives the data identification information from process executing portion 57, first association data storing portion 55 generates a first association record including the user identification information for the user authenticated by authentication portion 53 and the data identification information, and adds it to first association data 71 stored in EEPROM 115 for storage.

FIG. 6 shows an example of the format of the first association record. Referring to FIG. 6, the first association record includes a "user identification information" field in which the user identification information for identifying the user designating execution of the data input process is set, and a "data identification information" field in which the data identification information for the data stored in HDD 116 by the data input process is set. More specifically, in the "user identification information" field, the user identification information for identifying the user who has designated the execution of the data input process is set. In the "data identification information" field, the data identification information for the data which is stored in HDD 116 as a result of execution of the data input process is set. The first association record associates the user identification information for the user who has designated the execution of the data input process with the data identification information for the data which is stored by the data input process executed.

It is noted that if history information stored as a history of the processes executed in process executing portion 57 includes information which specifies the user who has designated execution of a process and information which specifies the data which is stored in HDD 116 as a result of the data input process, the history information may be assumed as the first association data.

Returning to FIG. 5, second association data storing portion 61 stores second association data 75 in EEPROM 115. Second association data 75 associates a process to be executed for the data stored as a result of the data input process, with a respective one of the first to third user I/Fs. Here, workflow definition information which defines a plurality of series of processes is used for the second association data. Second association data storing portion 61 accepts the second association data which an MFP 100 user, i.e. an administrator of MFP 100 for example, inputs into operation portion 160B or remotely, and stores it in EEPROM 115. It is noted that the second association data may be stored for each user.

FIG. 7 shows an example of the workflow definition information. Referring to FIG. 7, the workflow definition information defines the order and types of the two processes. Here, FIG. 7 shows the workflow definition information in which the type of the process executed first is assumed as the data input process. FIG. 7 also shows that the data input process includes an authentication print process, a facsimile reception process, and a BOX storage process. The authentication print process is a process that temporarily stores into HDD 116 print data with a password input from the outside, and then prints the print data stored, provided that the password is input. The facsimile reception process is a process that temporarily stores data received by facsimile, into a predetermined area in HDD 116. The BOX storage process is a process that stores into a specified storage area (BOX) in HDD 116 data which is output from original reading portion 130 after being read from an original by original reading portion 130, or data which is input from the outside.

For each of these three data input processes, the type of the process to be executed second is associated with a respective one of the first to third user I/Fs. For the first data input process "authentication print", the process identification information "job execution" for identifying the process of executing a job is associated with the I/F identification information "operation panel" for identifying the first user I/F. The process identification information "job acquisition" for identifying the process of acquiring the stored data is associated with the I/F identification information "PC browser" for identifying the second user I/F. The process identification information "job deletion" for identifying the process of deleting the stored data is associated with the I/F identification information "mobile communication terminal browser" for identifying the third user I/F.

For the second data input process "facsimile reception", the process identification information "job execution" for identifying the process of executing a job is associated with the I/F identification information "operation panel" for identifying the first user I/F. The process identification information "job acquisition" for identifying the process of acquiring the stored data is associated with the I/F identification information "PC browser" for identifying the second user I/F. The process identification information "job deletion" for identifying the process of deleting the stored data is associated with the I/F identification information "mobile communication terminal browser" for identifying the third user I/F.

For the third data input process "BOX storage", the process identification information "job execution" for identifying the process of executing a job is associated with the I/F identification information "operation panel" for identifying the first user I/F. The process identification information "job acquisition" for identifying the process of acquiring the stored data is associated with the I/F identification information "PC browser" for identifying the second user I/F. The process identification information "job deletion" for identifying the process of deleting the stored data is associated with the I/F identification information "mobile communication terminal browser" for identifying the third user I/F.

Returning to FIG. 5, when the user is authenticated in authentication portion 53, determining portion 59 firstly determines whether HDD 116 stores data which is associated with the user identification information of the authenticated user by first association data 71, and if so, determining portion 59 determines a screen for accepting settings for causing process executing portion 57 to execute the process which is associated by the second association data with the one of the first to third user I/Fs through which the authentication information has been accepted. Specifically, when the user identification information is input from authentication portion 53 into determining portion 59, determining portion 59 extracts a first association record including the user identification information input from authentication portion 53, from first association data 71 stored in EEPROM 115. If a plurality of the first association records is extracted, the latest record may be selected, or the user may select any one of them. Here, it is assumed that the latest one of the first association records is selected. When the first association record is not extracted, determining portion 59 outputs to instruction accepting portion 51 an instruction to output a menu screen. Instruction accepting portion 51 outputs the menu screen input from determining portion 59 via the one of the first to third user I/Fs that has accepted the authentication information.

It is preferable that determining portion 59 extracts only the first association record that includes the data identification information for identifying the data for which a process has not yet been executed. After the data input process is executed, the data which has not yet been processed can be extracted. Therefore, only the data requiring a series of processes can be extracted. For example, the first association record including the data identification information for the data which has been processed before, among the data stored in HDD 116, may be deleted from first association data 71.

Determining portion 59 specifies, from the area in which the data specified by the data identification information included in the first association record extracted is stored, the data input process that was executed when the data was stored. It is noted that the first association record may include a field in which the process identification information for identifying the data input process is set, in which case the data input process can be specified from the first association record.

In determining portion 59, the I/F identification information for identifying one of the first to third user I/Fs through which the authentication information has been accepted is input from instruction accepting portion 51. Determining portion 59 refers to second association data 75, and specifies the process associated with the data input process which is specified by referring to first association data 71, for the I/F identification information input from instruction accepting portion 51. Determining portion 59 then determines a screen for accepting the settings to direct process executing portion 57 to execute the process, from among screens 73 stored in EEPROM 115. Determining portion 59 outputs to instruction accepting portion 51 an instruction to output the determined screen. In response, instruction accepting portion 51 outputs the screen input from determining portion 59, via the one of the first to third user I/Fs that has accepted the authentication information.

Accordingly, when a user uses one of the first to third user I/Fs to execute a data input process and then logs in to MFP 100 using the one of the first to third user I/Fs and is authenticated in MFP 100, a screen for executing the process predefined for that user I/F by the second association data (workflow) is displayed. As a result, the user can operate MFP 100 easily without the need of switching between screens.

Figure 8:
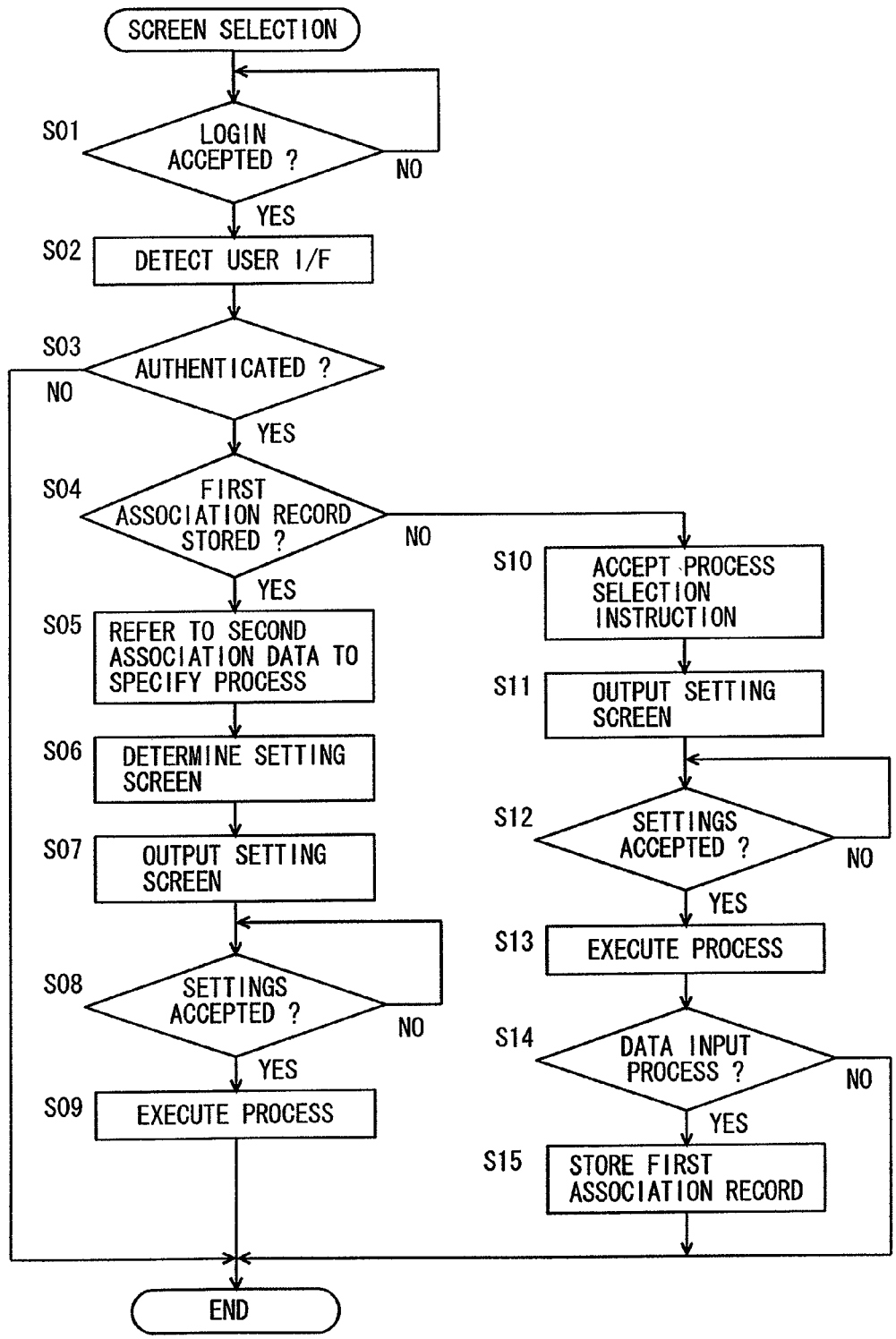
FIG. 8 is a flowchart illustrating an example of the flow of a screen selection process.

FIG. 8 is a flowchart illustrating an example of the flow of the screen selection process. The screen selection process is carried out by CPU 111 as CPU 111 executes a screen selection program. Referring to FIG. 8, CPU 111 determines whether a login instruction has been accepted (step S01). CPU 111 is in a standby mode until the login instruction is accepted (NO in step S01), and once the login instruction is accepted (YES in step S01), the process proceeds to step S02. The login instruction is a request for a login screen.

In step S02, a user I/F which has accepted the login instruction is detected. If operation portion 160B has accepted the login instruction, the first user I/F is detected. If communication I/F portion 112 has accepted the login instruction from PC 105, 105A, or 105B, the second user I/F is detected. If communication I/F portion 112 has accepted the login instruction from mobile communication terminal 200, the third user I/F is detected. If wireless communication portion 170 has accepted the login instruction from mobile communication terminal 200, the third user I/F is detected.

In step S03, the authentication information is accepted and the authentication step is executed. If the same authentication information as the accepted authentication information is stored in advance, the user is authenticated. If not, the user is not authenticated. When the user is authenticated, the process proceeds to step S04. When the user is not authenticated, the process is terminated. In step S04, it is determined whether the first association record including the user identification information of the user authenticated in step S03 is included in first association data 71. If so, the process proceeds to step S05; otherwise, the process proceeds to step S10. The first association record is added to first association data 71 and stored in EEPROM 115 in step S15 which will be described later.

In step S10, a process selection instruction is accepted. The instruction to select a process which is input into the user I/F detected in step S02 is accepted. A setting screen into which settings are to be input for executing the process specified by the accepted process selection instruction is output to the user I/F detected in step S02 (step S11). If the first user I/F has been detected in step S02, the setting screen is displayed in display portion 160A. If the second user I/F has been detected in step S02, the setting screen is transmitted to one of PCs 105, 105A, and 105B that issued the process selection instruction, via communication I/F portion 112. If the third user I/F has been detected in step S02, the setting screen is transmitted to mobile communication terminal 200 via one of communication I/F portion 112 and wireless communication portion 170 that has received the process selection instruction.

CPU 111 is in a standby mode until settings are accepted (NO in step S12), and once the settings are accepted, the process proceeds to step S13. In step S13, a process is executed according to the accepted settings. It is then determined whether the process executed in step S13 is a data input process (step S14). If so, the process proceeds to step S15; otherwise, step S15 is skipped and the screen selection process is terminated. In step S15, a first association record is generated and added to first association data 71 stored in EEPROM 115 for storage. Specifically, the first association record including the user identification information of the user authenticated in step S03 and the data identification information of the data which has been stored in HDD 116 by the data input process executed in step S13 is generated and stored in EEPROM 115.

On the other hand, in step S05, CPU 111 refers to second association data 75 to specify a process. Specifically, CPU 111 firstly specifies the data input process from the area in HDD 116 in which the data specified by the data identification information included in the first association record extracted in step S04 is stored. CPU 111 then refers to second association data 75 stored in EEPROM 115 to determine the process identification information for the user I/F detected in step S02, from the process identification information associated with the process identification information of the data input process specified.

In the case where the data input process with the process identification information "authentication print" is specified, the process identification information "job execution" is determined if the first user I/F is detected, the process identification information "job acquisition" is determined if the second user I/F is detected, and the process identification information "job deletion" is determined if the third user I/F is detected. In the case where the data input process with the process identification information "facsimile reception" is specified, the process identification information "job execution" is determined if the first user I/F is detected, the process identification information "job acquisition" is determined if the second user I/F is detected, and the process identification information "job deletion" is determined if the third user I/F is detected. In the case where the data input process with the process identification information "BOX storage" is specified, the process identification information "job execution" is determined if the first user I/F is detected, the process identification information "job acquisition" is determined if the second user I/F is detected, and the process identification information "job deletion" is determined if the third user I/F is detected.

In the following step S06, the setting screen for the process with the process identification information specified in step S05 is determined from among screens 73 stored in EEPROM 115. The screen determined here is the setting screen for the user I/F detected in step S02.

In step S07, the setting screen determined in step S06 is output to the user I/F detected in step S02. If the first user I/F has been detected in step S02, the setting screen is displayed in display portion 160A. If the second user I/F has been detected in step S02, the setting screen is transmitted to one of PCs 105, 105A, and 105B that has transmitted the authentication information to CPU 111, via communication I/F portion 112. If the third user I/F has been detected in step S02, the setting screen is transmitted to mobile communication terminal 200 via the one of communication I/F portion 112 and wireless communication portion 170 that has received the authentication information.

CPU 111 is in a standby mode until settings are accepted (NO in step S08), and once the settings are accepted, the process proceeds to step S09. In step S09, a process is executed according to the accepted settings before the screen selection process is terminated.

Figure 9:
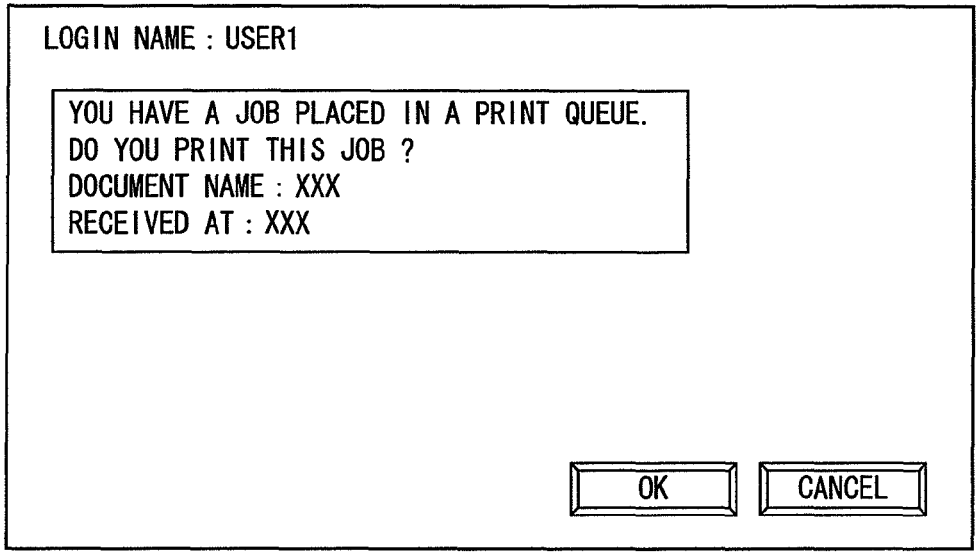
Figure 10:
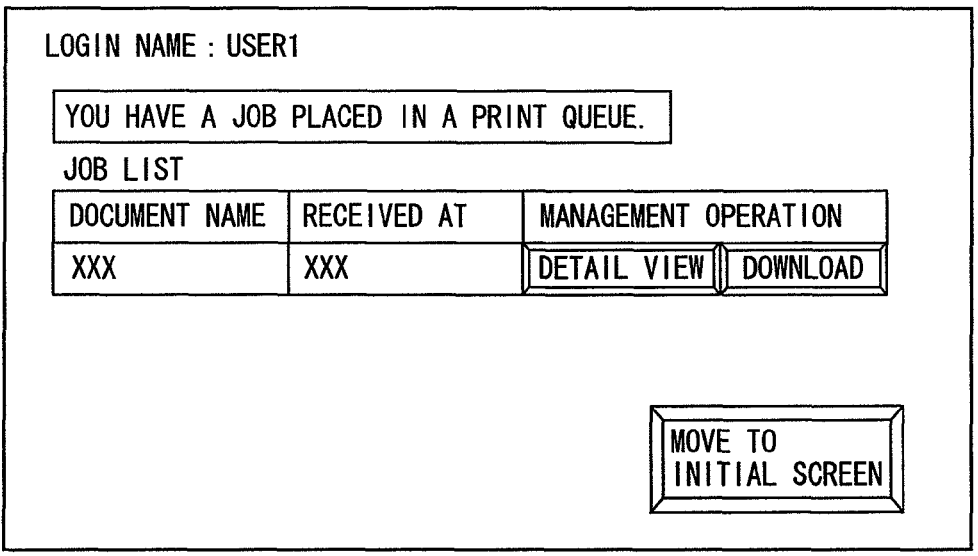
Figure 11:

FIGS. 9 to 17 show examples of the setting screen. Among them, FIGS. 9 to 11 show examples of the setting screen determined when the data input process is specified as the one having the process identification information "authentication print". FIG. 9 shows an example of the setting screen determined when the first user I/F is detected, FIG. 10 shows an example of the setting screen determined when the second user I/F is detected, and FIG. 11 shows an example of the setting screen determined when the third user I/F is detected. Referring to FIG. 10, the process with the process identification information "job acquisition" is determined for the second user I/F when the data input process is "authentication print". In this case, the setting screen for the "job acquisition" process is a job management screen for designating a download of a job including the "authentication print" job.

FIGS. 12 to 14 show examples of the setting screen determined when the data input process is specified as the one having the process identification information "facsimile reception". FIG. 12 shows an example of the setting screen determined when the first user I/F is detected, FIG. 13 shows an example of the setting screen determined when the second user I/F is detected, and FIG. 14 shows an example of the setting screen determined when the third user I/F is detected. Referring to FIG. 13, the process with the process identification information "job acquisition" is determined for the second user I/F when the data input process is "facsimile reception". In this case, the setting screen for the "job acquisition" process is a screen for designating a download of the data which is stored in an area (a confidential box) in the storage area in HDD 116 that is assigned to the logged-in user for the "facsimile reception" process.

Figure 15:
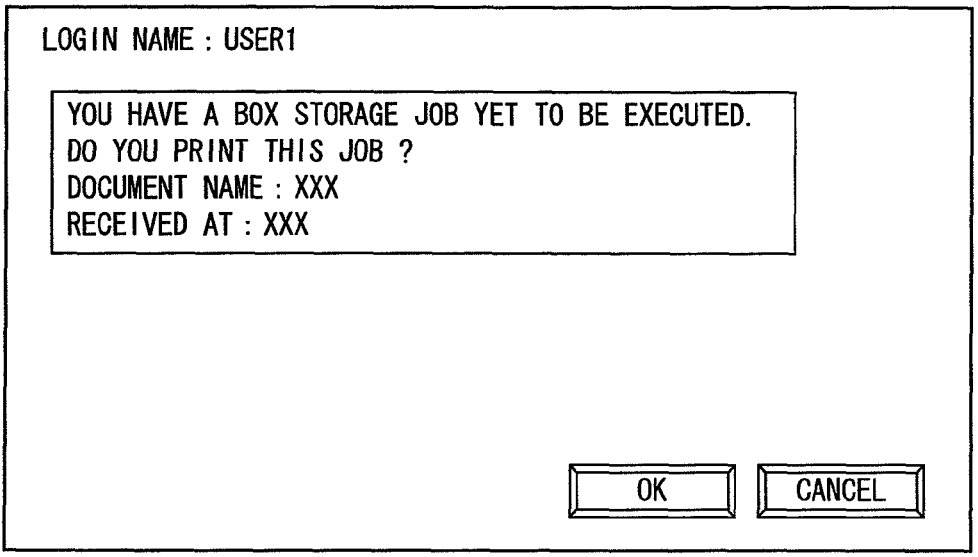
Figure 16:
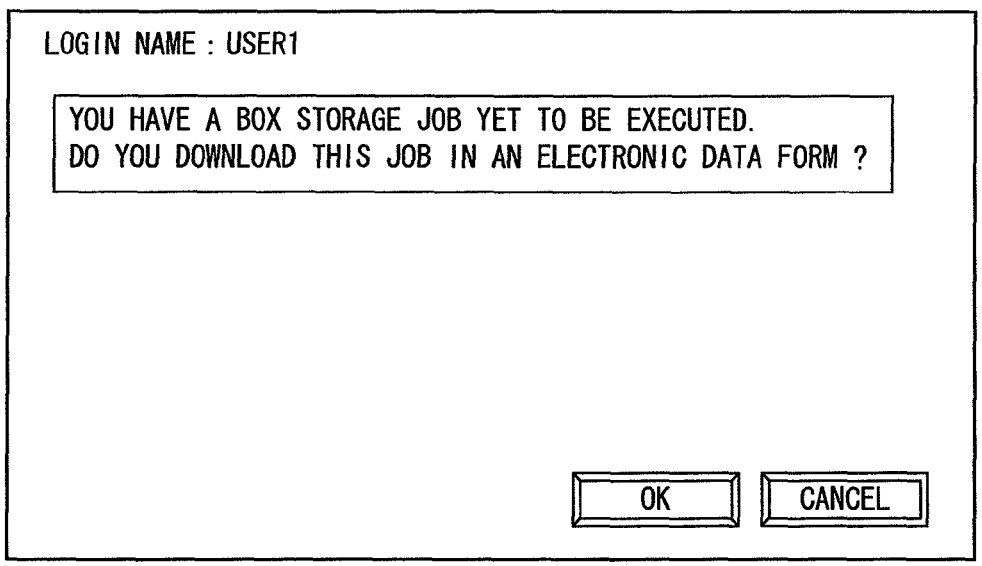
Figure 17:
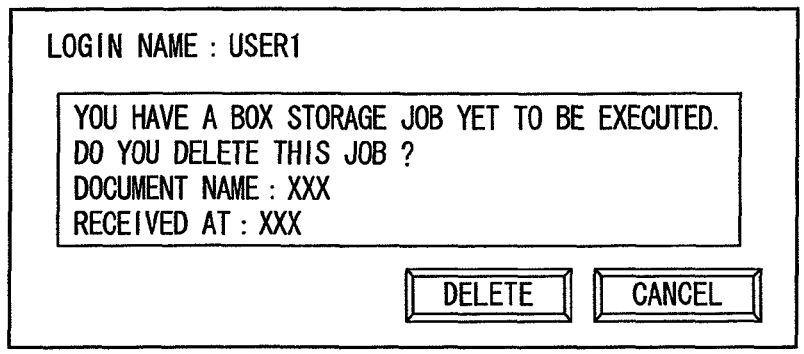

FIGS. 15 to 17 show examples of the setting screen determined when the data input process is specified as the one having the process identification information "BOX storage". FIG. 15 shows an example of the setting screen determined when the first user I/F is detected, FIG. 16 shows an example of the setting screen determined when the second user I/F is detected, and FIG. 17 shows an example of the setting screen determined when the third user I/F is detected. Referring to FIG. 16, the process with the process identification information "job acquisition" is determined for the second user I/F when the data input process is "BOX storage". In this case, the setting screen for the "job acquisition" process is a document download screen for inputting an instruction to download the data stored in HDD 116.

As described above, in the image processing system of the present embodiment, MFP 100 serving as the image processing apparatus includes: first to third user I/Fs; authentication portion 53 which accepts authentication information input into one of the first to third user I/Fs, and authenticates a user based on the authentication information; process executing portion 57 which executes at least one of a plurality of types of processes according to settings input into the one of the first to third user I/Fs; first association data storing portion 55 which stores first association data in the case where the process executed by process executing portion 57 is a data input process in which data is input from the outside, the first association data associating the input data with the user identification information of the user authenticated; second association data storing portion 61 which stores second association data (workflow) associating a process to be executed for the input data with a respective one of the first to third user I/Fs; and determining portion 59 which determines, in response to the authentication by authentication portion 53, a screen for accepting settings to cause process executing portion 57 to execute the process associated by the second association data with one of the first to third user I/Fs through which the authentication information used for the authentication by authentication portion 53 has been accepted, in the case where data associated by the first association data with the user identification information of the user authenticated is stored.

Accordingly, when the data input process in which data is input from the outside is executed, the first association data is stored which associates the input data with the user identification information of the user authenticated, and furthermore, the second association data (workflow) is stored which associates the process to be executed for the data that has been input by the data input process, with a respective one of the first to third user I/Fs. When the user is authenticated, if data associated by the first association data with the user identification information of the user authenticated has been stored, the screen for accepting the settings for execution of the process associated by the second association data (workflow) with one of the first to third user I/Fs to which the user has input the authentication information is determined. Therefore, the process suitable for the user interface used by the user can be immediately executed for the data which is input through the data input process executed. As a result, the number of times of switching between screens can be decreased.

While image processing system 1 has been described in the above embodiment, the present invention may of course be understood as a screen selection method for executing the process shown in FIG. 8, or a screen selection program for causing a computer to execute the screen selection method.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image processing apparatus comprising:
a first memory configured to store first association data which associates input data targeted for processing with user identification information;
a plurality of types of user interfaces configured to accept an instruction from a user, said plurality of types of user interfaces includes:
a first interface which includes a display portion and an operation accepting portion, the display portion configured to display said screen, the operation accepting portion configured to accept an operation from a user; and
a second interface which includes a communication portion configured to communicate with an external device;
an authentication portion configured to authenticate a user based on authentication information input into one of said plurality of types of user interfaces;
a process executing portion configured to execute at least one of a plurality of types of processes according to settings input into the one of said plurality of types of user interfaces;
a second memory configured to store second association data which associates a respective one of said plurality of types of user interfaces with a respective one of plurality of different processes, corresponding to the one of said plurality of types of user interfaces, as a process to be executed for said input data targeted for processing;
a judging portion configured to judge whether or not data targeted for processing and associated by said first association data with the user identification information of a user authenticated by said authentication portion is stored;
a specifying portion configured to specify a process associated by said second association data with the one of said plurality of types of user interfaces through which said authentication information has been accepted, in a case where it is judged by said judging portion that data targeted for processing and associated by said first association data with the user identification information of said authenticated user is stored; and
a determining portion configured to determine a screen for accepting settings for causing said process executing portion to execute the process corresponding to the user interface through which said authentication information has been accepted and having been specified by said specifying portion for data targeted for processing and associated by said first association data with the user identification information of said authenticated user,
wherein:
said second interface includes an interface configured to accept a remote operation of the image processing apparatus from a personal computer, and an interface configured to accept a remote operation of the image processing apparatus from a mobile communication terminal; and
said first interface is associated with a process of printing said input data targeted for processing by the image processing apparatus, said interface configured to accept a remote operation of the image processing apparatus from a personal computer is associated with a process of causing the personal computer to acquire said input data targeted for processing, and said interface configured to accept a remote operation of the image processing apparatus from a mobile communication terminal is associated with a process of deleting said input data targeted for processing.

2. The image processing apparatus according to claim 1, wherein said second memory is configured to store a workflow defining a plurality of series of processes.

3. A screen selection method executed by an image processing apparatus, the image processing apparatus including a plurality of types of user interfaces for accepting an instruction from a user, the screen selection method comprising the steps of:
   storing first association data which associates input data targeted for processing with user identification information, said plurality of types of user interfaces includes:
   display portion configured to display said screen, the operation accepting portion configured to accept an operation from a user; and
   a second interface which includes a communication portion for communicating with an external device;
   accepting authentication information input into one of said plurality of types of user interfaces and authenticating a user based on said authentication information;
   executing at least one of a plurality of types of processes according to settings input into the one of said plurality of types of user interfaces;
   storing second association data which associates a respective one of said plurality of types of user interfaces with a respective one of plurality of different processes, corresponding to the one of said plurality of types of user interfaces, as a process to be executed for said input data targeted for processing;
   judging whether or not data targeted for processing and associated by said first association data with the user identification information of a user authenticated in said authenticating step is stored;
   specifying a process associated by said second association data with the one of said plurality of types of user interfaces through which said authentication information has been accepted, in a case where it is judged in said judging step that data targeted for processing and associated by said first association data with the user identification information of said authenticated user is stored; and
   determining a screen for accepting settings for the process to be executed in said executing step, the process corresponding to the user interface through which said authentication information has been accepted and having been specified in said specifying step for data targeted for processing and associated by said first association data with said user identification information of the authenticated user, wherein
   said second interface includes an interface configured to accept a remote operation of the image processing apparatus from a personal computer, and an interface configured to accept a remote operation of the image processing apparatus from a mobile communication terminal; and
   said first interface is associated with a process of printing said input data targeted for processing by the image processing apparatus, said interface configured to accept a remote operation of the image processing apparatus from a personal computer is associated with a process of causing the personal computer to acquire said input data targeted for processing, and said interface configured to accept a remote operation of the image processing apparatus from a mobile communication terminal is associated with a process of deleting said input data targeted for processing.

4. The screen selection method according to claim 3, wherein said step of storing the second association data includes the step of storing a workflow defining a plurality of series of processes.

5. A non-transitory computer-readable recording medium encoded with a screen selection program executed by a computer controlling an image processing apparatus, the image processing apparatus including a plurality of types of user interfaces for accepting an instruction from a user, the screen selection program causing said computer to execute the steps of:
   storing first association data which associates input data targeted for processing with user identification information;
   accepting authentication information input into one of said plurality of types of user interfaces and authenticating a user based on said authentication information;
   executing at least one of a plurality of types of processes according to settings input into the one of said plurality of types of user interfaces;
   storing second association data which associates a respective one of said plurality of types of user interfaces with a respective one of plurality of different processes, corresponding to the one of said plurality of types of user interfaces, as a process to be executed for said input data targeted for processing;
   judging whether or not data targeted for processing and associated by said first association data with the user identification information of a user authenticated in said authenticating step is stored;
   specifying a process associated by said second association data with the one of said plurality of types of user interfaces through which said authentication information has been accepted, in a case where it is judged in said judging step that data targeted for processing and associated by said first association data with the user identification information of said authenticated user is stored; and
   determining a screen for accepting settings for the process to be executed in said executing step, the process corresponding to the user interface through which said authentication information has been accepted and having been specified in said specifying step for data associated by said first association data with said user identification information of the authenticated user,
   wherein said plurality of types of user interfaces includes:
   a first interface which includes a display portion and an operation accepting portion, the display portion configured to display said screen, the operation accepting portion configured to accept an operation from a user; and
   a second interface which includes a communication portion for communicating with an external device, and
   said second interface includes an interface configured to accept a remote operation of the image processing apparatus from a personal computer, and an interface configured to accept a remote operation of the image processing apparatus from a mobile communication terminal; and
   said first interface is associated with a process of printing said input data targeted for processing by the image processing apparatus, said interface to accept a remote operation of the image processing apparatus from a personal computer is associated with a process of causing the personal computer to acquire said input data targeted for processing, and said interface configured to accept a remote operation of the image processing apparatus from a mobile communication terminal is associated with a process of deleting said input data targeted for processing.

6. The non-transitory computer-readable recording medium encoded with the screen selection program according to claim 5, wherein said step of storing the second association data includes the step of storing a workflow defining a plurality of series of processes.

* * * * *